United States Patent

Recks

[15] 3,660,823

[45] May 2, 1972

[54] SERIAL BIT COMPARATOR WITH SELECTABLE BASES OF COMPARISON

[72] Inventor: John A. Recks, Lincoln, Mass.

[73] Assignee: Honeywell Inc., Minneapolis, Minn.

[22] Filed: July 20, 1970

[21] Appl. No.: 56,595

[52] U.S. Cl. ....................340/146.2

[51] Int. Cl. ....................G06f 7/02

[58] Field of Search ....................340/146.2; 235/177

[56] References Cited

UNITED STATES PATENTS

| | | | |
|---|---|---|---|
| 3,218,609 | 11/1965 | Shaw | 340/146.2 |
| 3,434,109 | 3/1969 | Coote | 340/146.2 |
| 3,237,159 | 2/1966 | Emmons | 340/146.2 |
| 2,889,534 | 6/1959 | Lubkin | 340/146.2 |
| 3,479,644 | 11/1969 | Spaid | 340/146.2 |
| 3,241,114 | 3/1966 | Zieper et al | 340/146.2 |

*Primary Examiner*—Malcolm A. Morrison
*Assistant Examiner*—David H. Malzahn
*Attorney*—Fred Jacob and Ronald T. Reiling

[57] ABSTRACT

A serial by bit comparator device is disclosed for determining the relative magnitude of two binary numbers. The comparator comprises a plurality of storage means for storing interrogating bits therein. Each storage means represents a proposition relative to the numbers to be compared, and the presence of an interrogating bit in a storage means signifies that the proposition for which that storage means represents is true. The binary numbers to be compared are fed into the comparator, and depending on their relative magnitude, permit or inhibit the continued storage of the interrogating bit. Means are provided to sense in which of the storage means there still remains an interrogating bit, hence determining which proposition is true, or if a given proposition is true.

8 Claims, 4 Drawing Figures

JOHN A. RECKS
Inventor
By Nicholas Prasinos
Attorney

JOHN A. RECKS
*Inventor*
By Nicholas Prasinos
*Attorney*

JOHN A. RECKS
*Inventor*
By Nicholas Prasinos
*Attorney*

JOHN A. RECKS
*Inventor*

*By* Nicholas Prasinos
*Attorney*

SERIAL BIT COMPARATOR WITH SELECTABLE BASES OF COMPARISON

BACKGROUND OF THE INVENTION

In the data processing field there are many requirements for comparing and determining the relative magnitude of the relative significance of two numbers or words. In some data processing systems as for example in systems used by large mail order firms it is necessary to update their customer files periodically and in such a system it is desirable to store, locate and retrieve data or information on records on the basis of content rather than address or location so frequently found in conventional data storage files. Such a memory system is generally termed an "associative memory". In such a system each record has some means, such as a word or portion thereof, for identifying that particular record. If a record of a particular file is to be updated or for example a new record is to be inserted between two old records, it is required to locate the old record either numerically in increasing or decreasing order or alphabetically. The old records are compared with the new record and when the appropriate place to update or insert the new record is found the necessary operation is performed.

In other comparison operations it is often necessary to compare two numbers or two words at a certain stage of a program and perform succeeding operations, loops, instructions or steps in accordance to the determined magnitude of the two numbers.

Comparators for use in data processing systems generally compare items of information represented by a binary code, by examining such information either serially item by item, or in parallel, all items of a given information being compared simultaneously. Examples of serial comparators may be found in U.S. Pat. No. 3,479,644 issued Nov. 18, 1969 and in U.S. Pat. No. 2,889,534 issued June 2, 1959. Examples of binary parallel digital comparators may be found in U.S. Pat. No. 3,390,378 issued June 25, 1968 and in U.S. Pat. No. 3,137,839 issued June 16, 1964.

Prior art serial digital comparators determine the relative magnitude of two binary numbers by examining two binary numbers which are fed into the comparator circuit one bit at a time. Each bit may have a significance assigned to it in accordance with the relative position of the bit in the number. Generally the bit occupying the left most position in a string of numbers is the most significant, and the significance decreases from left to right. In some serial comparators, the two binary numbers are fed into the comparator circuit with the least significant bit to be examined first, whereas other serial comparators examine the most significant bit first. The advantage of examining the most significant bit first is that where it is desired to determine which number is greater the comparison may be terminated on the first miscompare wherein the new item is greater than the old item. (By miscompare in this application is meant that one bit is greater than another.) Although with this type of a circuit it is possible to determine the relative magnitude of two numbers, the circuit may not be interrogated by any of a number of questions or combinations of questions to determine the validity or invalidity of such interrogation. The circuit utilizing interrogation is disclosed in U.S. Pat. No. 3,246,294 issued Apr. 12, 1966. However, this circuit operates on the principle of matching one word to the other by inverting all matching "1" bits of one of the words; thus a match produces all zeros. Complex circuitry is therefore required to implement this scheme.

Comparing two binary digital numbers in parallel is generally performed by subtracting one binary number from another with a "borrowed term" developed from the circuitry indicating which of the numbers is the greatest. Whereas this operation may be performed in the arithmetic unit of the central processor it does tie up the central processor. To provide special circuitry for performing this operation requires a relatively large number of gating components and complex logic circuitry.

Accordingly it is an object of the present invention to provide an improved serial comparator of binary numbers.

Another object of the invention is to provide a comparator which examines items of information in decreasing order of significance.

Still another object of the invention is to provide a serial comparator for binary numbers that may be interrogated in eight different ways.

A further object of the invention is to provide a serial digital comparator of binary numbers to interrogate a plurality of propositions with a minimum of circuitry.

BRIEF DESCRIPTION OF THE INVENTION

These and other objects are achieved according to the invention by providing a comparator comprising a plurality of storage means for storing an interrogating bit therein, each storage means representing a proposition relative to the numbers to be compared, and the presence of an interrogating bit in a storage means signifying that the proposition for which that storage means represents is true. The binary numbers to be compared are fed simultaneously, highest order bit first into the comparator; and depending on their relative magnitude, means are enabled or disabled to permit or inhibit the continued storage of the interrogating bit in the storage means. The storage means in one embodiment are latching amplifiers and the enabling or disabling means are AND gates. Means are provided to sense in which storage means there still remains an interrogating bit, hence determining which proposition is true.

One feature of this invention is the conservation of central processing time because the comparator may be located in a peripheral control unit close to the source of some of the information, and also to the destination of the information.

Another feature of the invention is the ability to interrogate the comparator in eight different ways according to the following table:

TABLE I

| High | Low | Equal |
|---|---|---|
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |
| 0 | 0 | 0 |

(The 1's in the above table represent questions asked of that column.)

These and other advantages of the invention will become apparent from the following description and the accompanying drawings.

DESCRIPTION OF A PREFERRED EMBODIMENT

General

Without limiting the invention, and in order to obtain a better appreciation of the invention, it will first be described with one possible environment for performing one possible task. In the process of updating a file for example, the existing file is generally placed on one disk drive or drum file or other mass storage device and a virgin pack or formatted pack is placed on another disk drive or drum. A search argument (the information to be used to update the old file or to be inserted in the old file) is transferred from a central processor unit into a peripheral processor unit having a volatile store medium such as a core memory or possibly a solid state memory. The identifying or key words of the old file are examined and compared relative to the search argument and when a transition is sensed, such as for example, from low compare to high compare, the new item is inserted in the new file in its proper numeric or alphabetic order as the case may be. This process may be repeated as many times as desired or until an entire new updated file is written.

Figure 1:
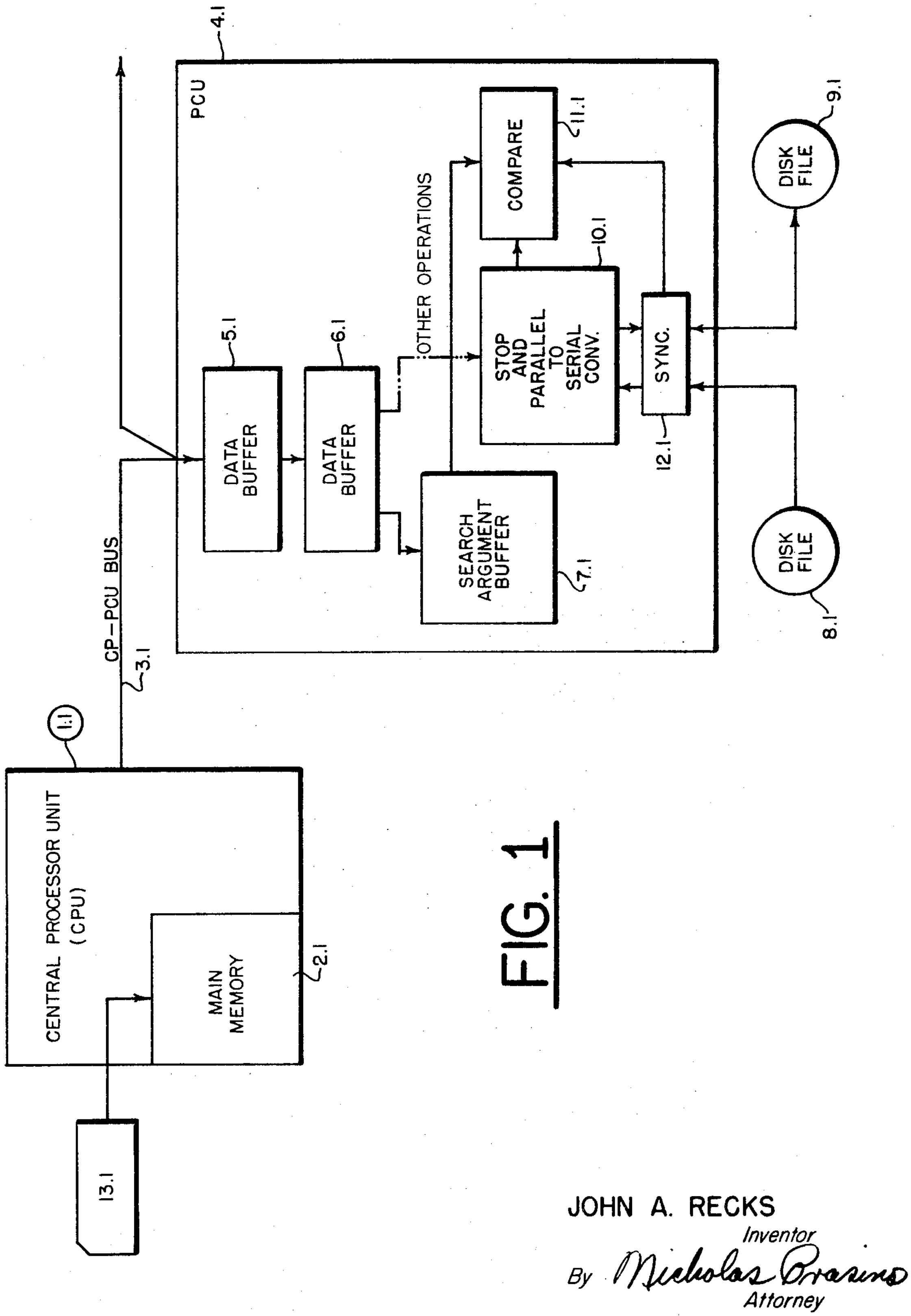
FIG. 1 is a block diagram of the invention as used in an automatic data processing system.

In FIG. 1 a new item of information punched in Hollerith card 13.1 is introduced into main core memory 2.1 of a central processor unit (CPU). In order to place this item on updated disk file 8.1 an order is initiated (by means not shown) over the CP-PCU Bus 3.1 to peripheral control unit (PCU) 4.1. The order is executed for transferring this item from CPU memory 2.1, via the CPU 1.1, over CP-PCU Bus 3.1 through buffer registers 5.1 and 6.1, into search argument buffer 7.1. These data buffer registers not only act as short term storage and load the search argument into the search argument buffer 7.1, but also synchronize the CP-PCU Bus 3.1, with the search argument buffer memory 7.1 and short term storage. The search argument buffer is solid state memory in which the search argument is stored within the control unit prior and during data comparison. Under conventional control of PCU 4.1, the data fields or key fields of old disk file 9.1 are searched and compared to the data or key field of the new item of information on Hollerith card 13.1 in the comparator 11.1. Paths are provided from the search argument buffer 7.1 where the new item of information is stored to comparator 11.1, and also paths are provided to and from disk files 8.1 and 9.1 and into and out of comparator 11.1. Parallel to serial converter 10.1 may be used when information is to be converted from parallel to serial format for introduction into the comparator 11.1. The comparator 11.1 may be set to high compare, low compare, or equal compare (to be later described in detail with FIG. 2) and when a transition in data magnitude from some item which is lower than the information on Hollerith card 13.1, for example, to some item higher than the information on Hollerith card 13.1, occurs it is then at this point that the item to be updated will be inserted into the new disk file 8.1. The CPU is informed that a transition has occurred whereupon the CPU issues a write instruction which retransmits the information of the Hollerith card 13.1 stored in main memory 2.1, over the CP-PCU Bus 3.1 through data buffers 5.1 and 6.1 into the parallel to serial converter and writes out the item on disk file 8.1 — the new file. After the item of new information is written on disk file 8.1 in its proper numeric or alphabetic order, as the case may be, the item of information on old disk file 9.1 which gave the first high compare is written on new disk file 8.1 after the information item on Hollerith card 13.1 just written. Hence the new item of information has been inserted between two old items in numeric or alphabetic order. This procedure is repeated until all items on old disk file 9.1 and all new items to be inserted are all written in proper order on new disk file 8.1.

Figure 2:
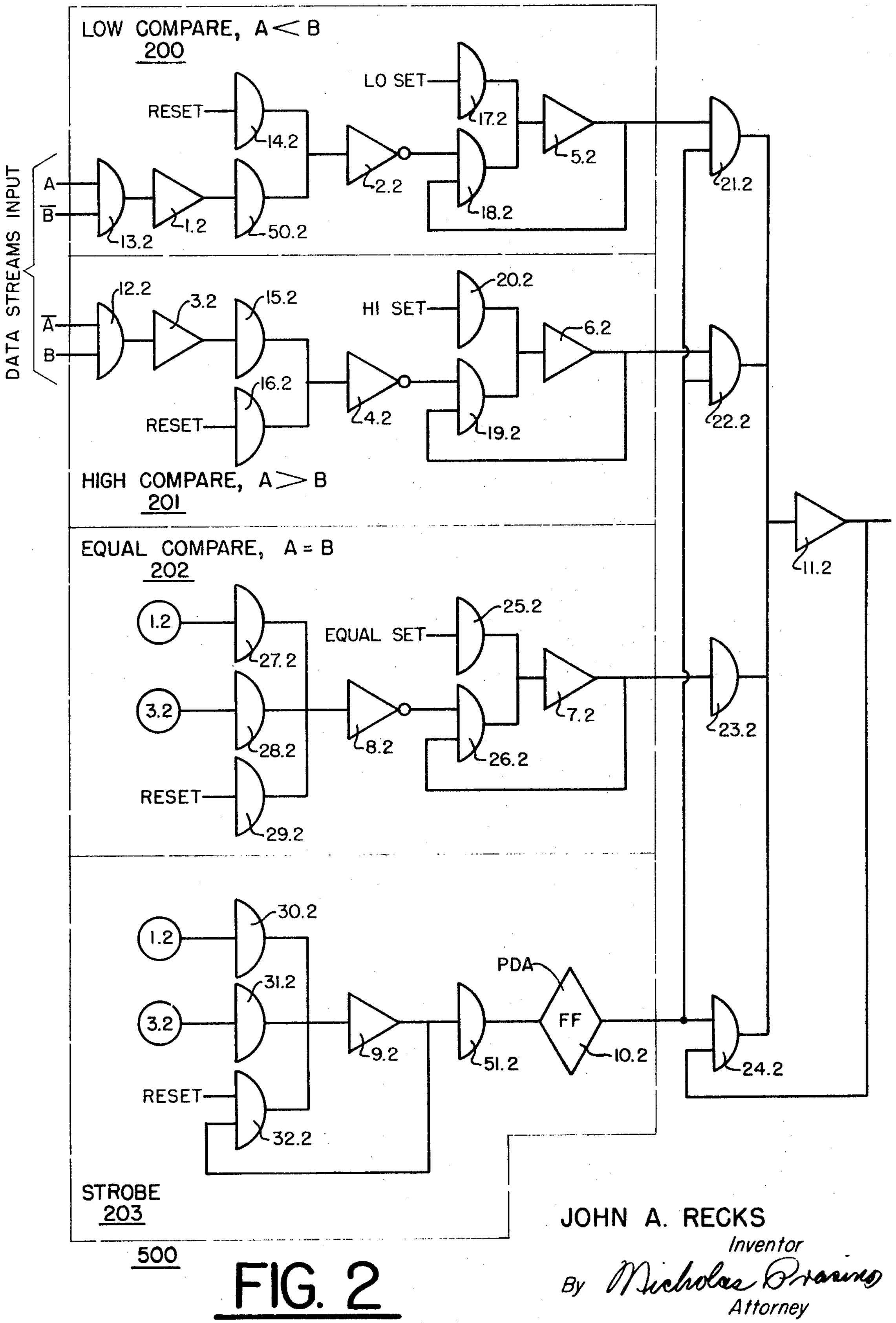
FIG. 2 is a logical diagram of an embodiment of the invention which serially compares digital information in accordance with the invention.

Referring to FIG. 2, it is seen that for ease of description, the logic circuitry has been divided into four major sections as follows: low compare 200; high compare 201; equal compare 202 and strobe 203. The logic compares two data streams A and B.

Low compare 200 is comprised of AND gate 13.2 which will accept data stream A and the complement of data stream B. AND gate 13.2 is coupled to amplifier 1.2 whose output is high when data stream A and the complement of data stream B are both high. The output of amplifier 1.2 is coupled to AND gate 50.2; AND gate 50.2 is ORed together with AND gate 14.2 and coupled to the input of inverter 2.2. AND gate 14.2 acts as a rest gate and serves to reset inverter 2.2. Inverter 2.2 together with gates 14.2 and 50.2 acts as a NOR gate whose output is low when the input of inverting amplifier 2.2 is high and vice versa the output of this equivalent NOR gate is high when the input to amplifier 2.2 is low. (A NOR gate is an inverted OR gate.) Amplifier 1.2 in combination with AND gate 13.2 drives the output of amplifier 1.2 high upon a presence of an A signal and the complement of a B signal. The output of inverter 2.2 is coupled to the input of AND gate 18.2 which is ORed together with low set gate 17.2 into amplifier 5.2. The combination of amplifiers 5.2, AND gates 18.2 and 17.2 act as a storage medium for an interrogating bit introduced through low set gate 17.2 as an electric signal which is high. AND gate 18.2 permits the storage of this interrogating bit in this circuit if the output of inverter amplifier 2.2 is also high or a "1". If the output of inverter amplifier 2.2 is low or a "0", gate 18.2 is disabled and the storage of the interrogating "1" bit is not permitted to be further stored in the storage circuit of amplifier 5.2. The presence of a "1" bit or high electric signal in circuit of amplifier 5.2 indicates that low compare is valid and item A is less than item B. When this condition is violated and A is greater than B represented by the input condition on gate 13.2 of $A.\bar{B}$, then amplifier 1.2 is driven high and inverter 2.2 is driven low disabling gate 18.2 and inhibiting the further storage of the "1" bit thus signifying that the low compare condition has been violated.

High compare logic circuit 201 is similar to low compare logic circuit 200 in structure with the exception that gate 12.2, comparable to low compare gate 13.2, will drive amplifier 3.2 high when B is greater than A represented by the Boolean expression at the input gate 12.2 of $\bar{A}.B$. Also gate 20.2, comparable to low set gate 17.2, is high set and introduces a high electric signal into the circuit of amplifier 6.2 representing a "1" bit. When a 1 bit is introduced in high set gate 20.2 into the storage means represented by the combination of amplifier 6.2 and gate 19.2 the high compare becomes valid and remains valid as long as the "1" bit or electric signal high remains in the storage means represented by the circuit of amplifier 6.2. In all other respects the high compare 201 is similar to the low compare 200 with gate 12.2 corresponding to gate 13.2, amplifier 3.2 corresponding to amplifier 1.2, gates 16.2 and 15.2 respectively corresponding with gates 14.2 and 50.2 respectively, inverter 4.2 corresponding to inverter 2.2 respectively, gates 19.2 and 20.2 corresponding to gates 18.2 and 17.2 respectively, and amplifier 6.2 corresponding to amplifier 5.2.

In equal compare circuit 202 amplifier 7.2 is the storage element for equal comparison, and its input is coupled to the output of equal set gate 25.2, and to the output AND gate 26.2 both gates being ORed to the input of amplifier 7.2. Amplifier 7.2 is set high representing a "1" bit, through equal set gate 25.2, and it recirculates on AND gate 26.2. The input of AND gate 26.2 is coupled to the output of inverter 8.2; the outputs of gates 27.2, 28.2, and 29.2 are ORed into amplifier 8.2; hence inverter 8.2 is looking into either A greater than B, or A less than B which are the outputs 3.2 and 1.2 respectively, which in turn are the inputs respectively of gates 28.2 and 27.2. An equal comparison of this circuit will be violated by either A greater than B, or A less than B. Reset gates 14.2, 16.2 and 29.2 respectively drive inverters 2.2, 4.2 and 8.2 respectively to ground; hence, the comparator 500 is purged or reset in preparation to the next order.

Strobe circuit 203 has AND gates 30.2, 31.2, and 32.2 ORed into amplifier 9.2. Amplifier 9.2 is a latching amplifier which "latches out", (stores the "1" condition via recirculation through gate 32.2), whenever bits of A and B miscompare (are not equal) as for example A greater than B or A less than B which are the outputs of amplifiers 1.2 and 3.2 respectively and also the inputs to gate 30.2 and 31.2 respectively. Flip-flop 10.2 coupled to amplifier 9.2 through single input AND gate 51.2 will fire when any miscompare is sensed and thus provides a pulse to strobe any condition of amplifiers 5.2, 6.2, or 7.2 which was not violated and remaining when flip-flop 10.2 fired. The condition not violated is strobed into amplifier 11.2 which signals a successful compare. AND gates 21.2, 22.2, 23.2, and 24.2 coupled to the outputs of amplifiers 5.2, 6.2, 7.2 and to flip-flop 10.2 respectively and also to the input of amplifier 11.2 serve to transmit any successful compare remaining in comparator 500 through amplifier 11.2.

The circuit components of FIG. 2 are generally conventional.

TTL 14 pin flatpacks are available from such typical manufacturers as Fairchild Semiconductor Corp.

Below is a table of a representative manufacturer's number for elements on FIG. 2.

TABLE II

| Circuit Number | Flatpack (I–C) | Manufacturer |
|---|---|---|
| 1.2, 3.2, 5.2, 6.2, 7.2 | DKAH2 | Fairchild Semiconductor |
| 2.2, 4.2 | DKVH2 | Fairchild Semiconductor |
| 8.2, 9.2, 11.2 | DKAC2 | Fairchild Semiconductor |
| 10.2 | DKFC1 | Fairchild Semiconductor |
| 13.2, 14.2, 17.2 | **13.2** is part of 1.2 | Fairchild Semiconductor |
| 18.2 | **14.2** is part of 2.2<br>17.2 is part of 5.2<br>18.2 is part of 5.2 | |

Operations of the Eight Condition Serial Bit Comparator

As has been previously discussed the purpose of the comparator is to compare two data strings/streams for example A and B, and to answer the following questions:

1. Is A greater than B?
2. Is B greater than A?
3. Is A equal to B?

The above questions may be asked of the device singly or in any combination, i.e. "is A greater or equal to B?" which is question (1) or (3). The time sequence in which signals are established is important. First, the question or questions are asked. Second, the entire data streams, A and B, are received by the comparator in serial, bit-by-bit form, with the highest order bit received first. Third, after a delay of substantially 250 microseconds, which permits changes in signal levels to propagate through the network, the output signal or answer to the question or questions is established. Fourth, the output is read or strobed by some external circuitry. Fifth, the network is reset to prepare for a repeat performance with new questions and new data strings.

Time 1:

The questions or any combinations thereof previously hereinbefore discussed are asked. These questions are asked by sending a logical "1" to the input labeled Lo Set (Question is A less than B?), Hi Set ( is A greater than B?), and/or Equal Set ( is A equal to B?) in any combination thereof. Consider the Lo Set input as an example. Lo Set feeds a "1" (High Signal) into amplifier 5.2 which is recirculated to maintain a "1" signal in the loop — provided that the output of the inverter logical NOT 2.2 is also a logical "1". Since the RESET into inverter 2.2 has previously set the input to a logical "0", then the output of the inverter 2.2 will be a logical "1", and the AND gate 18.2 will be enabled. Hence, recirculation of a "1" will be permitted. (Amplifier 5.2 will remain high.)

Similarly, the question "is A greater than B?", is asked by establishing a circulating logical "1" in amplifier loop 6.2; and the question "is A equal to B?", is asked by establishing a circulating "1" within amplifier loop 7.2.

Hence, if nothing else occurs, the answers to the asked questions are YES. This is represented by a logical "1" stored in said circulation loops.

Time 2:

Data Streams A and B arrive, bit-by-bit, high order first. There are two possible conditions for the highest order bits of A and B. The bits are the same (00 or 11) or they are different (01 or 10); how then, are these two cases handled by the Equal query circuit?If they are the same, and also the Equal Set loop 7.2 has been initialized through Equal Set gate 25.2 to circulate a "1" in amplifier 7.2 then the input to inverter 8.2 will be zero since inputs $A\cdot\bar{B}$ from amplifier 1.2 and input $B\cdot\bar{A}$ from amplifier 3.2, are both 0. The output of inverter 8.2 will be a "1" (high signal) and the output of amplifier 7.2 will be a "1". The output is then sent to amplifier 11.2 and represents the answer "Yes" to the question, "is A equal to B?".

If the highest order bits of A and B are not equal, then the input to inverter 8.2 will be a "1" since $\bar{A}\cdot B$ or $A\cdot\bar{B}$ will be "1". The output of inverter 8.2 is a "0" which will close the AND gate 26.2, nullifying the "1" circulating through amplifier 7.2. The "0" output to amplifier 11.2 then represents a "No" answer to the question "is A equal to B?".

For the two cases A greater than B (Hi Set), and A less than B (Lo Set) if A equals "1" and B equals "0" than $\bar{A}\cdot B$ equals 0. The output of amplifier 3.2 is therefore "0", and the output of inverter 4.2 is a "1"; hence, the circulating "1" in amplifier 6.2 loop is maintained, and the output of amplifier 6.2 is "1" signifying a "Yes" answer to the question "is A greater than B?".

Conversely, if A equals "0" and B equals "1", than $\bar{A}\cdot B$ equals 1. The output of amplifier 3.2 is "1", and the output of inverter 4.2 is "0"; hence, the circulating "1" is changed to a "0" by the inhibiting action of the AND gate 19.2 and the output of amplifier 6.2 is "0", signifying a "No" to the question.

Parallel activity appears simultaneously in the Lo Set Circuit, also yielding the correct answer to the question "is A less than B?".

Note that if the highest order bits are equal, the circuit cannot determine which number is larger by comparing the highest order bits alone. It is necessary for the circuit to wait until the first pair of unequal bits arrive. This decision-prohibiting action is performed by amplifier 9.2.

If A equals B, and a high or low compare were asked for, the input and output of amplifier 9.2 will be "0", and the circulation loop of amplifier 11.2 will be inhibited by AND gate 24.2 hence, the output of amplifier 11.2 will be 0, and will remain 0 so long as the bit-by-bit comparison reveals that A is equal to B. If, however, an equal compare were requested, and no miscompare had been sensed, gate 23.2 would feed amplifier 11.2 directly thus forcing it high, "1".

Time 3:

When a pair of dissimilar bits are detected, amplifier 9.2 will send a "1" to flip-flop 10.2. Flip-flop 10.2 introduces a delay signal which permits the strobing of a circulating "1", in amplifier loops 5.2 or 6.2 into amplifier 11.2.

Time 4:

External circuitry not shown, because it is not essential to the invention, further strobes the output of amplifier 11 to deliver the "Yes" or "No" answers to appropriate parts of the system.

Time 5:

Finally an external signal is applied to the RESETS which places "0"s" into all circulating loops and initializes the comparator.

Figure 3:
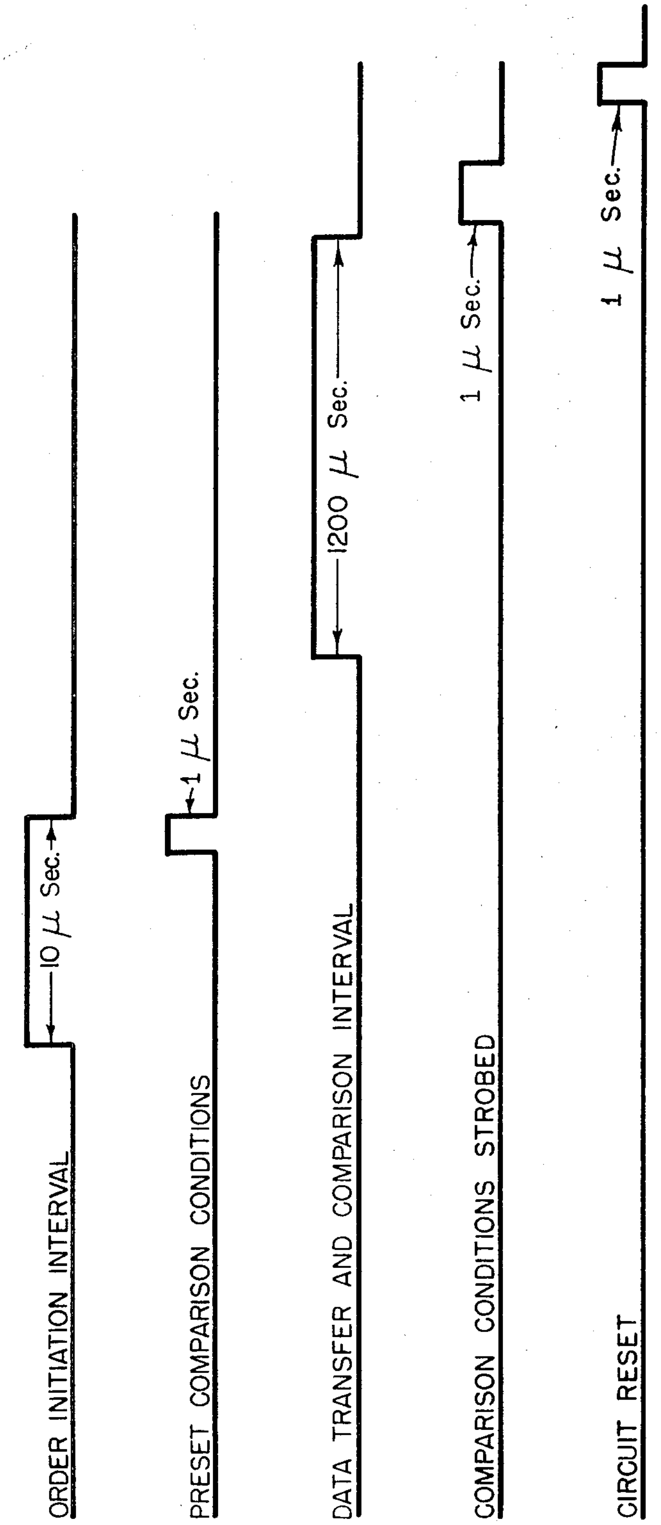
FIG. 3 is a time chart of a representative set of signals which may occur in the comparator of FIG. 2.

Referring to FIG. 3 the timing diagrams illustrate the timing cycles for initiating orders, transferring data, and resetting the circuit. The order initiation interval (approximately 10 $\mu$sec.) initiates the sequences of reading information and comparing, and during this interval the preset comparison conditions are set into amplifier 5.2, 6.2 or 7.2 via Lo Set, Hi Set or Equal Set. Data is transferred and compared during the Data Transfer and Comparison Interval, about 1,200 microseconds in FIG. 3. Upon the termination of comparison the conditions remaining in any event, of amplifiers 5.2, 6.2 or 7.2 are strobed by a Comparison Condition Strobe cycle, and finally a cycle or Circuit Reset clears all storage elements via resets 16.2, 29.2 and 32.2.

Figure 4:
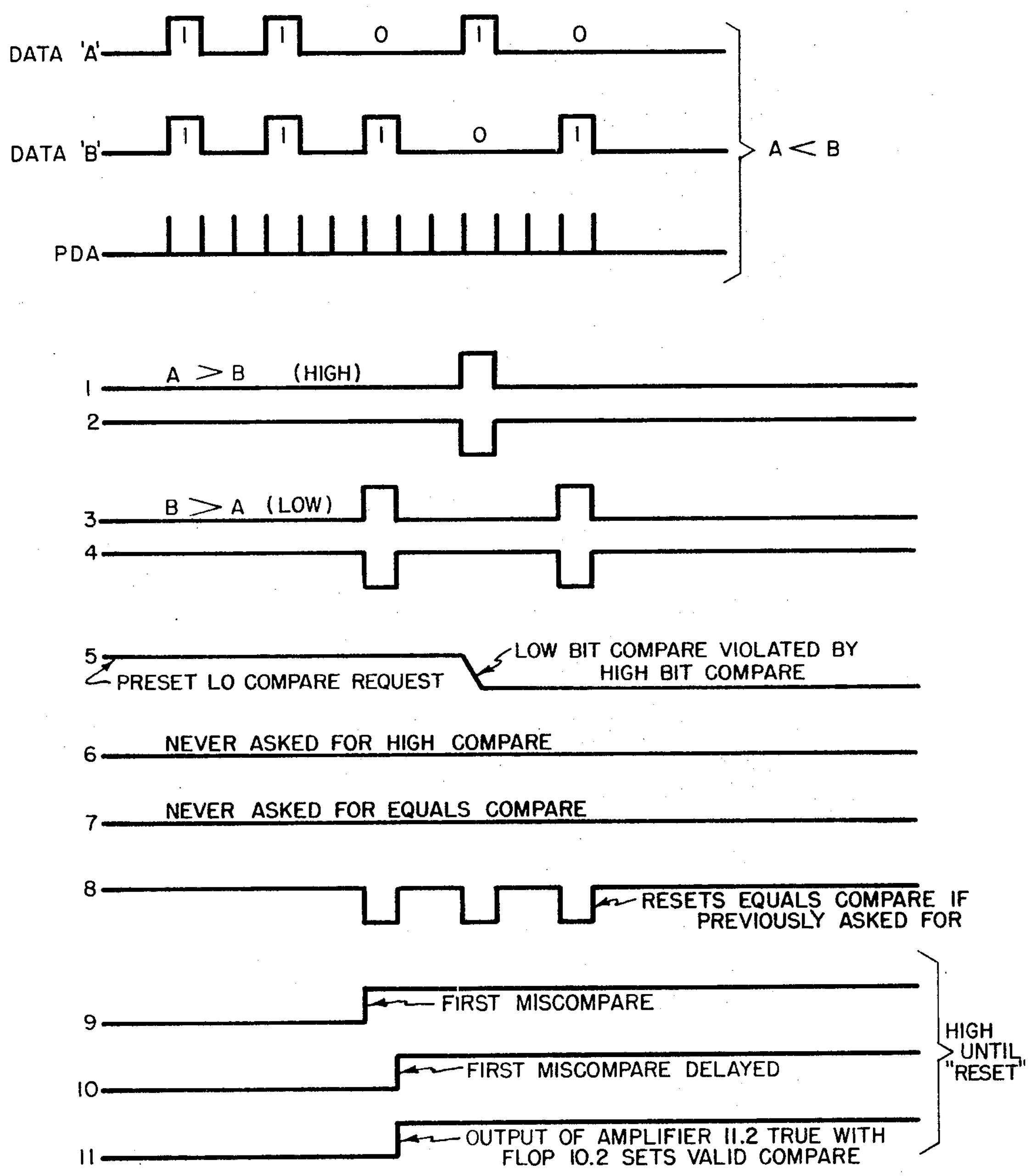
FIG. 4 is a representative time chart assuming the interrogation is a low compare.

Referring now to FIG. 4, a specific example is illustrated wherein we wish to accept a low compare or A less than B. Data Stream "A" represents the binary number 11010 and Data Stream "B" represents the binary number 11101, wherein the "1's" are represented by pulses, and "0's" by no pulses. The PDA's are the internal clock pulses of the controller.

The pulses numbered on the left from 1 to 11 represent the logic element output of a correspondingly numbered element on FIG. 2. For example, the output of logic element 1.2 on FIG. 2 is shown on FIG. 4 by pulse 1; the output of logic element 2.2 on FIG. 2 is shown on FIG. 4 by pulse 2; this reasoning process can be carried out through to logic element 11.2 and pulse 11 on FIG. 4. In this particular case, we desire to accept a low compare or A less than B. The first two bits in both data stream "A" and data stream "B" are "1" and hence both equal; hence no output from logic elements 1.2 or 3.2 (2.2 and 4.2 are the inverse of 1.2 and 3.2 respectively). The third information bit cell of data streams "A" and "B" are unequal; data "A" is a "0" while data "B" is a "1". This first bit miscompare therefore defines the case B greater than A, or A less than B. The inputs of gate 3.2 are satisfied and its output 3 goes high forcing inverter 4.2 to ground. If, at this point, we were looking for a high compare, amplifier 6.2 would drop to ground, thus violating a compare. However, we are looking for a low compare or a A less than B, which we requested, therefore amplifier 5.2 does not drop to ground because amplifier 1.2 and inverter 3.2 did not pulse during the third bit cell interval. Amplifier 9.2 and sync flop 10.2 now pulse, (shown as pulses 9 and 10 on FIG. 4) and strobe the ORed condition of amplifiers 5.2, 6.2 and 7.2 into amplifier 11.2. Since amplifier 5.2 (low compare) is still a "1" amplifier 11.2 will set via gate 21.2 and recirculate on gate 24.2 signifying a successful compare.

It will be apparent from the foregoing disclosure of the invention that numerous modifications, changes and equivalents will now occur to those skilled in the art, all of which fall within the true spirit and scope contemplated by the invention.

What is claimed is:

1. A comparator device for comparing two binary numbers A and B, each number coded into a series of electrical signals sequentially arranged in decreasing order of significance, said comparator comprising:

a. a plurality of storage elements each representing a proposition relative to the binary numbers to be compared;

b. first means for introducing into each of said storage elements a first electronic signal representing an interrogating bit for storage in said storage elements, the presence of the first electric signal in any of said storage elements signifying an assertion of the truth of the proposition represented by said storage element;

c. second means coupled to storage elements for introducing in selected ones of said storage elements the coded electric signals representing the binary numbers to be compared;

d. said storage elements including third means responsive to the first electric signal representing the interrogating bit stored in said storage elements and to the coded electric signals representing the binary numbers to be compared, for adjusting the state of said storage elements;

e. and fourth means responsive to the state of said storage elements for detecting the first electric signal in any one of said storage elements.

2. A comparator device as recited in claim 1 wherein there are three storage elements, one storage element representing the proposition A is greater than B when having a "1" bit stored therein, another storage element representing the proposition that A is less than B when having a "1" bit stored therein, and still another storage element representing the proposition that A is equal to B when having a "1" bit stored therein.

3. A comparator device as recited in claim 2 wherein 8 combinations of interrogations are possible the "1" bit representing a possible query according to the following table:

| Hi | Lo | Equal |
|---|---|---|
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 (Always compare) |
| 0 | 0 | 0 (Never compare). |

4. A bit serial comparator device for bit serially comparing and determining the relative magnitude of two binary numbers comprising:

a. first recirculating amplifier circuit means settable for determining that a first binary digit is greater than a second binary digit;

b. second recirculating amplifier circuit means coupled to said first means said second means settable for determining that a first binary digit is less than a second binary digit;

c. third recirculating amplifier circuit means coupled to said first and second means said third means settable for determining that a first binary digit is equal to a second binary digit;

d. input means coupled to said first, second and third means for introducing the first and second binary digits to each of said first, second and third means;

e. and output means coupled to said first, second and third means for receiving and outputting an answer from said first, second and third means.

5. A serial comparator as recited in claim 4 including initializing means coupled to said first, second and third means for initializing said comparator.

6. A serial comparator as recited in claim 4 wherein said output means includes delay means for permitting changes in signal levels to propagate through said comparator.

7. In combination with a data processing system, a bit serial comparator device for bit serially comparing and determining the relative magnitude of two binary numbers comprising:

a. first recirculating amplifier circuit means settable for determining that a first binary digit is greater than a second binary digit;

b. second recirculating amplifier circuit means coupled to said first means said second means settable for determining that a first binary digit is less than a second binary digit;

c. third recirculating amplifier circuit means coupled to said first and second means said third means settable for determining that a first binary digit is equal to a second binary digit;

d. input means coupled to said first, second and third means said input means for introducing the first and second binary digits to each of said first, second and third means;

e. and output means coupled to said first, second and third means for outputting an answer from said first, second and third means.

8. A method of serially comparing two binary numbers A and B to determine whether or not A is greater than, less than or equal to B, comprising:

a. coding the binary members into a series of electrical signals sequentially arranged in decreasing order of significance;

b. translating into electrical signals the propositions A is greater than B, A is less than B, and A is equal to B;

c. comparing the electrically coded numbers, most significant digit first, with said electrically translated propositions;

d. determining which proposition is valid in relation to the binary numbers A and B;

e. eliminating the propositions determined not to apply to the numbers A and B; and f. strobing the valid propositions to the computer system.

* * * * *

UNITED STATES PATENT OFFICE

CERTIFICATE OF CORRECTION

Patent No. 3,660,823 Dated May 2, 1972

Inventor(s) John A. Recks

It is certified that error appears in the above-identified patent and that said Letters Patent are hereby corrected as shown below:

Column 8, line 66, "members" should read -- numbers --.

Signed and sealed this 31st day of October 1972.

(SEAL)
Attest:

EDWARD M.FLETCHER,JR.
Attesting Officer

ROBERT GOTTSCHALK
Commissioner of Patents